Mar. 20, 1923.

W. H. MANNING.
SURVEYING INSTRUMENT.
FILED MAR. 9, 1920.

Inventor:
W. H. Manning
by Wright, Brown, Quinby & May
Attys.

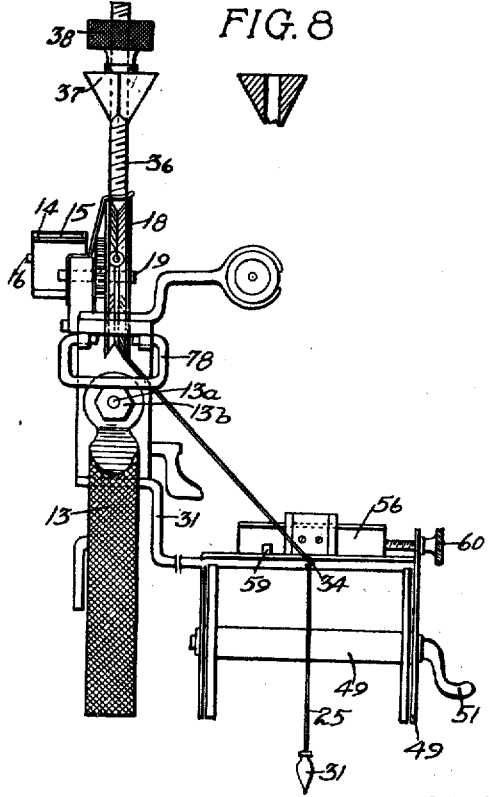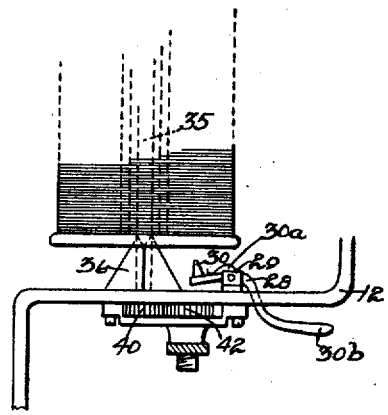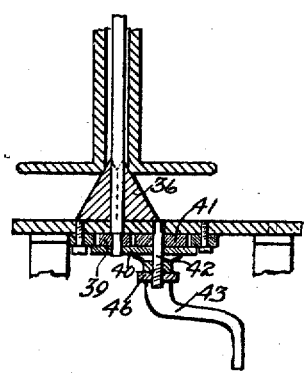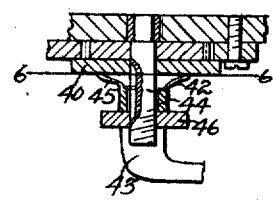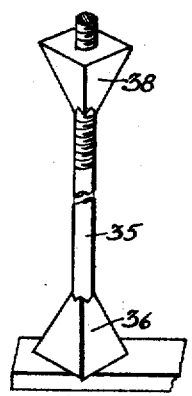

Mar. 20, 1923.                    W. H. MANNING.                    1,448,931.
                                SURVEYING INSTRUMENT.
                                 FILED MAR. 9, 1920.                 4 SHEETS—SHEET 3.
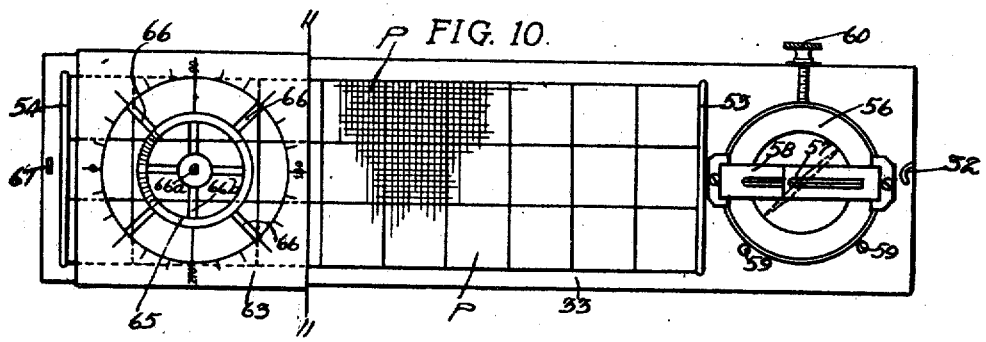
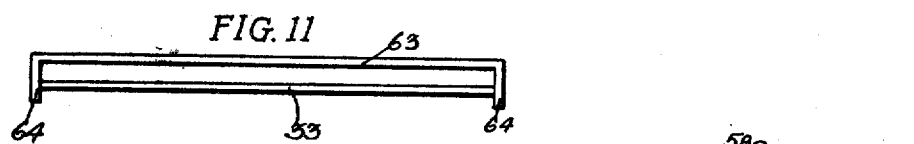
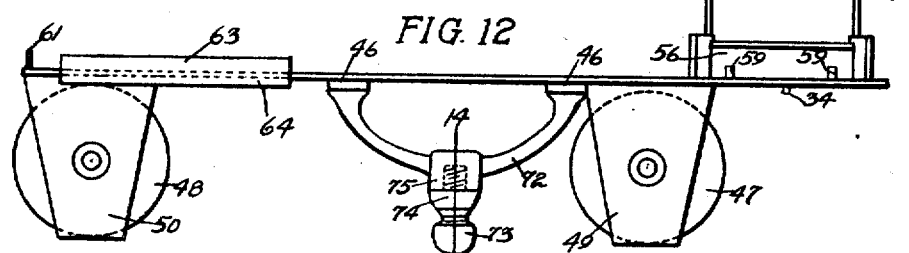
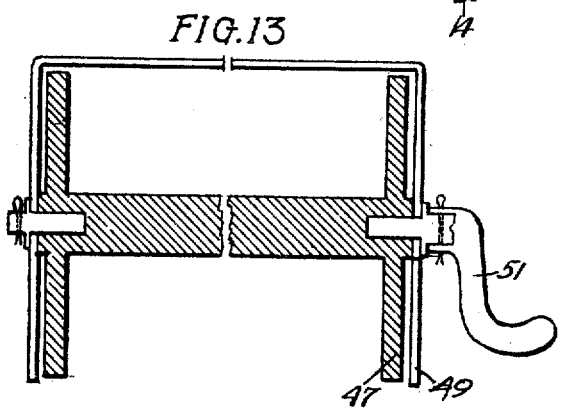
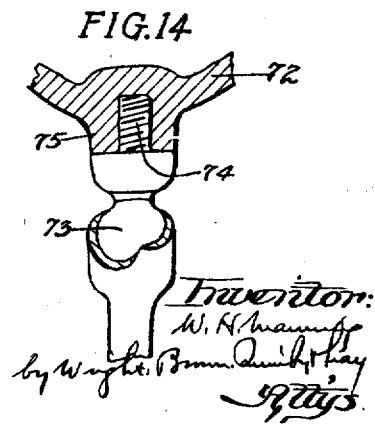

Mar. 20, 1923.

W. H. MANNING.
SURVEYING INSTRUMENT.
FILED MAR. 9, 1920.

Patented Mar. 20, 1923.

1,448,931

UNITED STATES PATENT OFFICE.

WARREN H. MANNING, OF BILLERICA, MASSACHUSETTS.

SURVEYING INSTRUMENT.

Application filed March 9, 1920. Serial No. 364,545.

*To all whom it may concern:*

Be it known that I, WARREN H. MANNING, a citizen of the United States, residing at Billerica, in the county of Middlesex and State of Massachusetts, have invented new and useful Improvements in Surveying Instruments, of which the following is a specification.

This invention relates particularly to an instrument for use in surveying land, and is embodied in a portable instrument including a carrier, adapted to be held by or to be attached to an operator, a reel mounted on the frame and storing a measuring strip of indeterminate length, and a cyclometer mounted on the frame and geared to a pulley adapted to be engaged by a measuring strip running either horizontally or vertically from a point near the reel, the construction and arrangement being such that when one end of the strip is held at a starting-point and the instrument is moved away from said point by the operator, or when the strip is dropped vertically by a weight, the withdrawal of the strip from the reel operates the cyclometer to register the length of the withdrawn portion of the strip and the distance traveled by the operator from the starting point, or the distance of the drop of the weight.

The invention also embodies a device for winding the measuring strip back onto the reel, and for quickly stopping the movement of the reel, a means for supporting a surveyor's compass to give angles of direction, a hand or Locke level, or telescope to give horizontal elevations, a reeled record strip having graduated squares to serve as a scale and to be held in position to receive indicia written by the operator, and a sliding protractor with the degrees marked to correspond to the compass and with openings so arranged as to permit the drawing of a line at any degree on the record strip.

The invention is also embodied in other improvements incidental to the general purposes of the invention.

Of the accompanying drawings forming a part of this specification,—

Figure 3 is an end view.

Figure 4 is a fragmentary section on the plane of line 4—4 of Figure 1.

Figure 5 is an enlargement of a portion of Figure 4.

Figure 6 is a section on line 6—6 of Figure 5.

Figure 7 is a fragmentary perspective view, showing the reel spindle.

Figure 8 is a sectional view of one of the reel-engaging members.

Figure 9 is a fragmentary side view, showing a manually operated reel stop.

Figure 10 is a plan view of the table plate.

Figure 11 is a sectional view on the plane of line 11—11 of Figure 10.

Figure 12 is a side view of the table plate, parts being shown in section.

Figure 13 is a sectional view of the record strip reel.

Figure 14 is a sectional view on the plane of line 14—14 of Figure 12.

The same reference characters indicate the same parts in all of the figures.

Figure 1:
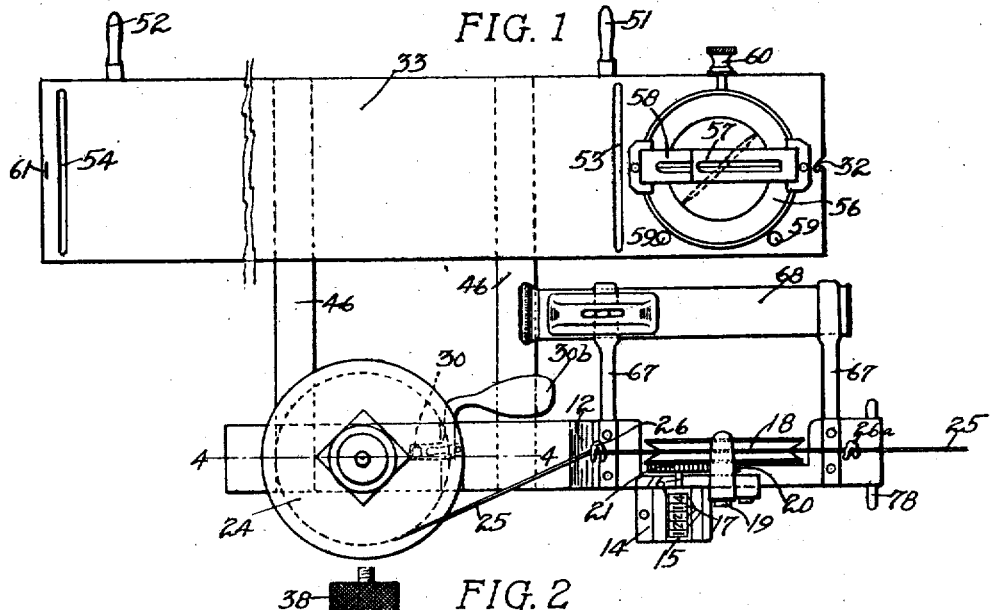
Figure 1 is a plan view of a surveying instrument embodying the invention.

In the drawings, 12 represents a portable frame provided with a shank 13, which may serve as a handle to be grasped by the operator, or as a member to engage a tripod supporting the instrument, the shank 13 being provided with a socket to receive a stud on the tripod. I prefer the shank 13 to be separably connected with the frame by a threaded bolt 13$^a$, and a clamping nut 13$^b$, so that the shank may be removed.

The frame, as here shown, is an elongated angular strip or plate, although it may be otherwise formed. Mounted on the frame is a cyclometer, preferably of the well known Veeder type, fully illustrated and described by Letters Patent of the United States, No. 548,482, dated October 22, 1895. The said cyclometer includes a casing 14 attached to the carrier and having a sight aperture 15, an actuating shaft 16 journaled in the casing, and a series of index wheels 17, mounted to rotate in the casing, means being provided, as shown by said patent, for actuating the first of said wheels from the actuating shaft, and each of said wheels from the next in order, so that the number of rotations of the shaft is registered by the wheels in a well known manner, the wheels being visible through the sight opening 15.

18 represents a pulley fixed to a shaft 19, which is journaled in a bearing 19ª on the frame 12. Said pulley is connected with the cyclometer shaft 16, preferably by gears 20 and 21 fixed to said shafts, and it preferably has a grooved rim to hold the strip from slipping off.

24 represents a spool or reel, having heads and a barrel of any suitable construction, on which is wound a measuring member or strip 25 of indeterminate and great length. The measuring strip may be a flexible, relatively heavy thread, a relatively light cord of textile material, reinforced, if desired, by wire, a flat tape, or a wire either of braided strands or a single strand; or, indeed, any sufficiently long, light and strong flexible strip. The strip may be subdivided and marked to indicate linear measurements.

The spool or reel 24 is arranged to deliver the strip unwound therefrom to the periphery of the pulley 18. In practice the measuring strip may be wound one or more times around the periphery of the pulley, so that it has a sufficient frictional engagement to rotate the latter, when drawn outwardly from the reel. To direct the measuring strip in operative relation to the pulley, I provide two guides 26, 26ª, attached to the carrier and arranged to guide the measuring strip to and from the periphery of the pulley. One end of the strip may be made fast to a fixed support, or otherwise held at a point from which a measurement is to be taken, the reel being adapted to rotate and permit the unwinding of the cord, when the instrument is moved away from said support.

Any suitable tensioning means may be employed to prevent too free rotation of the reel, and consequent reeling off of the strip. A friction device adapted to serve that purpose is later described. In addition, a lock effective to stop the reel and hold it from rotation is indicated as a lever 28, pivoted at 29 on the frame, and having a foot 30 to bear on the under head of the reel, and a spring 30ª tending to remove said foot from the reel, and a handle or trigger end 30ᵇ offset for depression by the thumb of the hand which grasps the handle.

Figure 2:
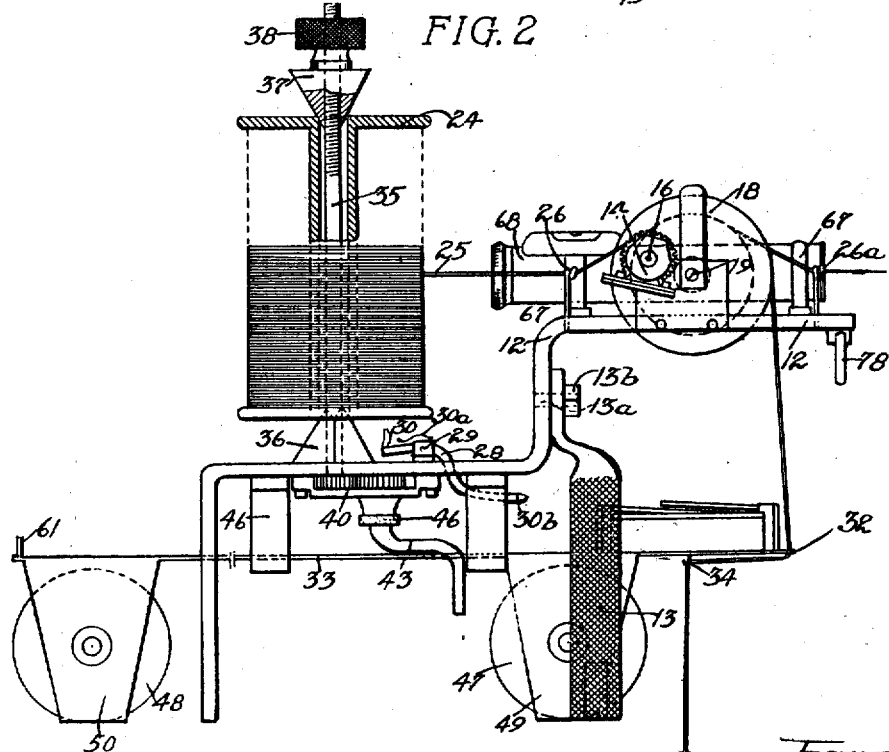
Figure 2 is a side view of the same, parts being shown in section.

When the end of the measuring strip is made fast at the starting point from which the surveyor travels, the strip is unwound from the reel, and in passing about the pulley 18, accurately measures the distance traveled from the starting point. For measuring heights and depths vertically, I may attach a weight such as the thumb bob 31 shown at Figure 2, to the measuring strip, and permit the weight to descend. For such use the strip is disengaged from the guide 26ª, and is passed through a notch 32 in the end of the tablet 33 hereinafter described, and also through a guide hook 34 projecting from the under side of the tablet. Or the weighted line may be allowed to hang directly downward from the pulley 18. In either of the herein-mentioned uses the cyclometer accurately measures the length of the strip which is drawn off, and the gearing by which the pulley drives the cyclometer may be designed to give readings on the cyclometer in any units of any system of measurement.

The reel is preferably mounted upon the carrier in a manner and by means which permit it to be driven for winding up the strip. A spindle 35 is mounted on the carrier projecting upwardly, and on its lower end is fixed a block 36, and on its upper end is loosely mounted a block 37, backed by a nut 38. These blocks are of pyramidal form, whereby they have convergent angles or ribs, which enter the bore of and become interlocked with, the reel when the nut 38 is screwed up tight, and thus prevent independent rotation of the reel on the spindle.

Or in place of the blocks formed as specifically herein shown and described, other types of gripping elements having ribs or spurs to indent and secure the reel may be used. The spindle 35 is rotatably mounted, passing through a bearing in the carrier, and having secured on its lower protruding end a pinion 39. This pinion and the lower block 36 provide abutments embracing the frame and holding the spindle firmly in an upright position. There is also secured to the under side of the frame a strap 40, in which also the spindle has a bearing, and between which and the frame is a space wherein the pinion 39, and also a gear 41 meshing therewith are contained. The gear 41 is secured upon a shaft 42 arranged substantially as shown in Figures 4 and 5, to which is attached a crank 43, adapted to be manually rotated for driving the reel in the winding-up direction. This crank is preferably detachable from the shaft 42, conveniently by having a tapped socket adapted to be screwed on the threaded end of the shaft. Said shaft also carries a friction brake to oppose the too free unwinding rotation of the reel; and this brake is conveniently made as a collar 44, splined upon the shaft, and having spring arms 45 which bear on the under side of the strap 40, with a pressure regulated by a nut 46 threaded upon the shaft. This nut and the crank 43 are, in effect, complemental lock nuts, each of which binds the other against being accidentally displaced.

Describing now the tablet 33 previously mentioned, the same is a flat plate which may be made of stiff sheet metal, wood, or any other material, firm and light enough for the purpose, and adapted to support a record strip or sheet conveniently to enable the operator to write or mark upon it. The tablet is supported upon the frame 2 by means of arms 46, 46, secured to the frame and projecting to one side therefrom. The most convenient form of record sheet for the use here contemplated, is a long paper strip, and to accommodate such a strip, I provide supply and take-up spools 47 and 48, which are hung beneath the tablet by brackets 49, 50, respectively, and are equipped with cranks 51, 52, for winding up the strip. Slots 53 and 54 are formed in the tablet for passage of the strip to and from said spools.

Preferably, a compass 56, equipped with sighting vanes 57 and 58 of ordinary character, is fastened on the tablet at one end thereof. The hook 34 previously mentioned, is located directly beneath the center of the compass, and is adapted to support a plumb bob to enable the compass to be used in the manner common with surveying instruments for laying a course from an exactly determined point. The compass is secured on the tablet by being clamped between posts 59, 59, and a set screw 60, in a manner which permits it to be readily removed and replaced, and also to be turned in position.

At the middle point of the opposite end of the tablet from the compass is a sighting element 61, in line with points 57ᵃ and 58ᵃ, Figure 12, which are formed on or applied to the upper ends of the sighting vanes or compass standards 57, 58, respectively.

For the record strip or sheet, I prefer to use paper which is ruled with coordinate lines, either in the form of common cross section paper, or at any other desired angles, for the convenience of the surveyor in plotting the results of his observations. The record sheet is shown in Figure 10, and is designated by the letter P. There is also provided in connection with the tablet a protractor 63, which comprises a base plate adapted to be set on the tablet over the paper, and furnished with flanges 64 to retain it on the tablet, and also to guide it while permitting movement to any desired position over the paper. In the protractor is a circular opening, the edge of which is graduated with a scale of angular degrees, or if desired, any other direction indications, and within said opening is a graduated ring 65, supported by braces 66, and at the common center of said opening and ring is a centrally apertured disk 66ᵃ, supported from the ring by arms 66ᵇ. The aperture of said disk permits a pencil point to be located at the center of the protractor. With the aid of the protractor lines may be drawn at exactly determined degrees of angle on the recorded sheet.

There is also supported from the carrier by means of brackets 67, a level or telescope 68, that here shown being the familiar Locke or hand level. The position of this level is at one side of the reel and counting mechanism, and above the tablet, whereby the surveyor may look through its sighting bore for determining levels and elevations.

Figure 15:
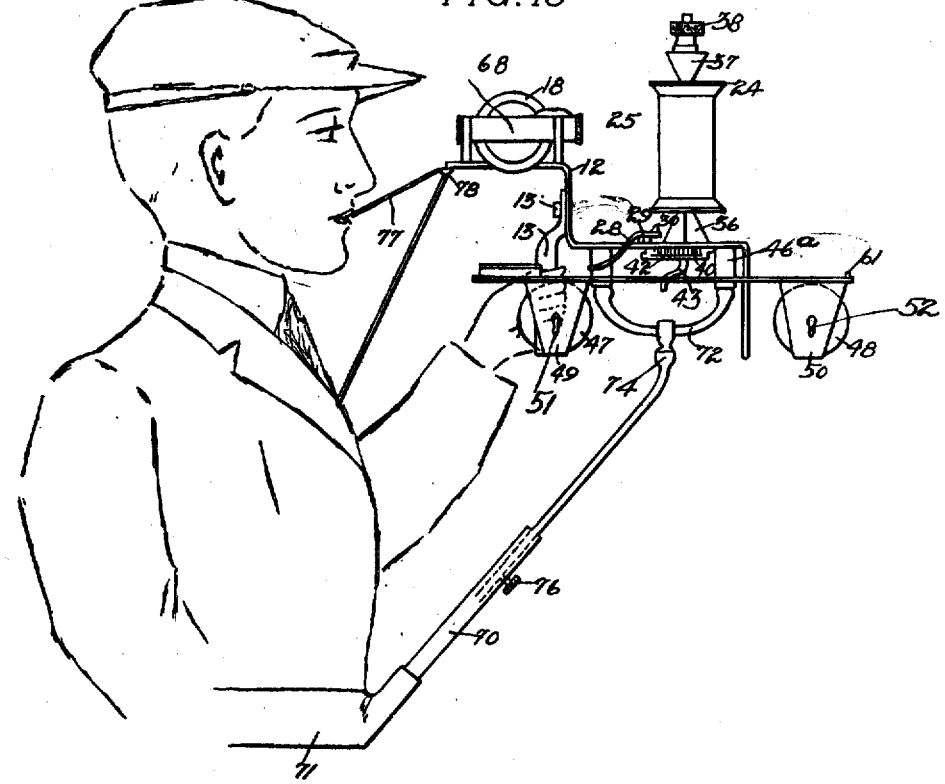
Figure 15 is a sketch view, showing the manner of use of the instrument.

This instrument is conveniently used in surveying work by being carried by the surveyor in substantially the manner shown in Figure 15. Its weight is mainly borne by a brace rod 70, fastened at its lower end to a belt 71 worn by the surveyor, and at its upper end to a bar 72, brazed, or otherwise rigidly secured to the tablet supports 46, as indicated also in Figure 12. This bar, however, may equally well be detachably secured to the tablet supports. That end of the brace rod 70 which is connected to the instrument, is equipped with a ball and socket joint 73, shown in Figures 12 and 14, the ball member of which is formed with a stud 74, which is screwed into a tapped hole in a boss 75 on the bar 72. The brace rod is adjustable in length, as shown in Figure 15, and its adjustments are secured by a set screw 76. A strap indicated at 77 and passing over the shoulder and under the arm of the surveyor to an attachment on the surveyor's belt, although any other convenient mode of fastening the strap may be used, is connected to a ring or loop 78, swivelled in the end of the base frame 12, and serves to assist in supporting and steadying the instrument, which finally is placed and held in the exact position for use by the surveyor's hand grasping the handle shank 13. By proper adjustment of the brace rod 70 and the strap 77, the instrument may be positioned with the level 68, on the level of the surveyor's eye.

It will be apparent that the instrument having characteristic features as those shown and described, may be used for determining levels, bearings, courses, elevations and distances, and that the determination of distances is made with great accuracy and in a manner permitting instant reading at any time, by means of the measuring strip and the cyclometer or counter. And notes, memoranda and plots may be recorded from time to time whenever desired, upon the record sheet on the tablet.

The capabilites for accomplishing all these results are embodied in an exceedingly compact instrument, of such light weight that it can be easily carried by the surveyor over long distances with little effort. As the weight of the instrument is borne entirely by the user's body, his hand and arm are needed only to hold the instrument in the determined line of sight, and this is accomplished without fatiguing effort.

When used for taking observations and measurements requiring immobility of the instrument, the latter may be disconnected from its brace rod by unscrewing the stud 74 of the ball and socket joint, and likewise disengaging it from the shoulder strap 77, and it may then be set on a staff, or a light tripod, such as that known in the art as Jacob's staff, since the handle shank 13 is formed with a socket in its lower end, to receive the stud of such a staff or tripod, as previously described. And when thus supported, the instrument may also be used for measuring distances vertically, by allowing the weighted end of the measuring line to descend.

I have not intended the foregoing detailed description of one particular embodiment of my invention to be taken as a limitation in any manner of my claim for protection. Some of the elements of the combined device, such as the compass, hand level, cyclometer or counter, protractor, and spool or reel for the measuring strip, are or may be standard articles, obtainable in open market, and any one of a number of differently made articles of this character may be assembled in the combination; or I may provide elements of special construction and design to serve the ends of the elements just particularly noted. For the rest, no further limitation of the scope of my protection is to be implied otherwise than appears from the express language of the appended claims.

I claim:

1. A surveying instrument comprising a frame adapted to be carried by a surveyor, means for supporting the frame including a device adapted to be fitted to the surveyor's body, and means on the frame for use in ascertaining the distance of the instrument from a starting point on horizontal, vertical and sloping lines including a flexible strip, a reel on which the strip is wound, and an indicator for displaying the length of the portion of the strip unwound from the reel.

2. A surveying instrument comprising a frame adapted to be carried by a surveyor, means for supporting the frame including a belt adapted to be secured about the surveyor's body, and means on the frame for use in ascertaining the distance of the instrument from a starting point on horizontal, vertical and sloping lines including a flexible strip, a reel on which the strip is wound, and an indicator for displaying the length of the portion of the strip unwound from the reel.

3. A surveying instrument comprising a portable carrier, a spindle journaled in the carrier, a supply reel engaged with the spindle, and having an elongated flexible measuring member wound thereon, a pulley journaled on the carrier, and adapted to be rotated by the withdrawal of the measuring member from the reel, and a counter in driven connection with the pulley, having means constructed and arranged to indicate the length of any portion of the measuring member withdrawn from the reel, the spindle being provided with means for releasably confining the supply reel thereon, so that a previously wound reel may be installed on the spindle.

4. A surveying instrument comprising a portable carrier, a spindle journaled in the carrier, a supply reel engaged with the spindle, and having an elongated flexible measuring member wound thereon, a pulley journaled on the carrier, and adapted to be rotated by the withdrawal of the measuring member from the reel, a counter in driven connection with the pulley, having means constructed and arranged to indicate the length of any portion of the measuring member withdrawn from the reel, and tensioning means associated with the spindle to frictionally resist unwinding rotation thereof.

5. A surveying instrument comprising a portable carrier, a spindle journaled in the carrier, a supply reel engaged with the spindle, and having an elongated flexible measuring member wound thereon, a pulley journaled on the carrier, and adapted to be rotated by the withdrawal of the measuring member from the reel, a counter in driven connection with the pulley, having means constructed and arranged to indicate the length of any portion of the measuring member withdrawn from the reel, tensioning means associated with the spindle to frictionally resist unwinding rotation thereof, and manually operable means for rotating said reel to wind the measuring member thereon, said tensioning means being adapted to be rendered inoperative, and thereby permit winding rotation of the reel without frictional resistance.

6. A surveying instrument comprising a portable carrier, a spindle journaled in the carrier, a supply reel engaged with the spindle, and having an elongated flexible measuring member wound thereon, a pulley journaled on the carrier, and adapted to be rotated by the withdrawal of the measuring member from the reel, and a counter in driven connection with the pulley, having means constructed and arranged to indicate the length of any portion of the measuring member withdrawn from the reel, the carrier being provided with a shank adapted to be grasped by the operator, and with a normally inoperative reel-locking lever adjacent the shank.

7. A surveying instrument comprising a portable carrier, adapted to support surveying instrumentalities, said carrier being provided with means engageable with the operator's body to support it in an elevated position, and with a shank adapted to be manipulated by one hand of the operator to determine the angular position of the instrument, so that the instrument may be controlled without the employment of the other hand, the latter being free to perform other functions.

8. A surveying instrument comprising a portable carrier, adapted to support surveying instrumentalities, a strut having a swivel connection at its upper end with the carrier, a body-encircling belt connected with the lower end of the strut, and a shank attached to the carrier and adapted to be manipulated by one hand of the operator to turn the carrier on said swivel connection and thus determine the angular position of the carrier.

9. A surveying instrument comprising a portable carrier, adapted to support surveying instrumentalities, a strut having a swivel connection at its upper end with the carrier, a body-encircling belt connected with the lower end of the strut, a flexible strip engaged with the carrier and the belt and engageable with a shoulder of the operator, and a shank attached to the carrier and adapted to be manipulated by one hand of the operator to turn the carrier on said swivel connection and thus determine the angular position of the carrier.

10. A surveying instrument substantially as specified by claim 12, said strut being composed of sections, one slidable on the other to vary the length of the strut, and with means for maintaining the strut at various lengths.

11. A device for the purpose described comprising a frame or carrier having a depending shank by which it can be supported, a reel mounted on the frame, an elongated flexible measuring member wound on the reel and means for indicating the amount of such member unwound from the reel, means adjacent said shank for rotating the reel to wind the measuring member thereon, and means extending into reach of the operator's hand grasping the shank for locking said reel against rotation.

12. A device for the purpose described comprising a frame or carrier having a depending shank by which it can be supported, a reel mounted on said frame to turn about an axis parallel to the length of said shank, an elongated, flexible, measuring member wound on said reel, means for indicating the amount of said measuring member unwound from the reel, a crank for rotating the reel to wind the measuring member thereon extending beyond the frame, friction means for checking rotation of the reel, and means for preventing rotation of the reel having an operative member adjacent the supporting shank.

In testimony whereof I have affixed my signature.

WARREN H. MANNING.